(12) United States Patent
Han et al.

(10) Patent No.: US 8,339,552 B2
(45) Date of Patent: Dec. 25, 2012

(54) ARRAY SUBSTRATE FOR FRINGE FIELD SWITCHING MODE LIQUID CRYSTAL DISPLAY DEVICE

(75) Inventors: Sanghun Han, Gunpo-si (KR); Kyung-Ha Hee, Gyeongsangnam-do (KR); In-Cheol Park, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 501 days.

(21) Appl. No.: 12/591,794

(22) Filed: Dec. 1, 2009

(65) Prior Publication Data

US 2010/0296040 A1 Nov. 25, 2010

(30) Foreign Application Priority Data

May 22, 2009 (KR) ........................ 10-2009-0044890

(51) Int. Cl.
*G02F 1/1343* (2006.01)
(52) U.S. Cl. .......................... 349/139; 349/141; 349/146
(58) Field of Classification Search .................. 349/139, 349/141, 146
See application file for complete search history.

(56) References Cited

U.S. PATENT DOCUMENTS

| 7,583,339 B2 * | 9/2009 | Park ................................ 349/114 |
| 7,855,772 B2 * | 12/2010 | Wang et al. .................... 349/144 |
| 2004/0233343 A1 * | 11/2004 | Baek ................................ 349/38 |
| 2010/0110351 A1 * | 5/2010 | Kim et al. ...................... 349/114 |

\* cited by examiner

*Primary Examiner* — Huyen Ngo
(74) *Attorney, Agent, or Firm* — McKenna Long & Aldridge, LLP

(57) ABSTRACT

An array substrate for a fringe field switching mode liquid crystal display device includes a substrate including a plurality of pixel regions each having a first domain, a second domain and a domain boundary area between the first and second domains; gate and data lines on the substrate and crossing each other to define the pixel region; a thin film transistor in each pixel region and connected to the gate and data lines; a pixel electrode in each pixel region and connected to the thin film transistor; and a common electrode overlapping the pixel electrode with an insulating layer interposed between the common and pixel electrode, wherein a plurality of openings are formed through the common electrode or the pixel electrode, and each opening has a first angle in the first and second domains with respect to a rubbing direction and a second angle larger than the first angle in the domain boundary area with respect to the rubbing direction.

17 Claims, 11 Drawing Sheets

ARRAY SUBSTRATE FOR FRINGE FIELD SWITCHING MODE LIQUID CRYSTAL DISPLAY DEVICE

The present application claims the benefit of Korean Patent Application No. 10-2009-0044890 filed in Korea on May 22, 2009, which is hereby incorporated by reference for all purposes as if fully set forth herein.

BACKGROUND OF THE INVENTION

1. Field of the Invention

The present invention relates to a liquid crystal display (LCD) device, and more particularly, to an array substrate for a fringe field switching (FFS) mode LCD device capable of having a multi-domain structure.

2. Discussion of the Related Art

A related art liquid crystal display (LCD) device uses optical anisotropy and polarization properties of liquid crystal molecules. The liquid crystal molecules have a definite alignment direction as a result of their thin and long shapes. The alignment direction of the liquid crystal molecules can be controlled by application of an electric field across the liquid crystal molecules. As the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling light transmissivity.

Since the LCD device including a thin film transistor (TFT) as a switching element, referred to as an active matrix LCD (AM-LCD) device, has excellent characteristics such as high resolution and display of moving images, the AM-LCD device has been widely used.

The AM-LCD device includes an array substrate, a color filter substrate and a liquid crystal layer interposed therebetween. The array substrate may include a pixel electrode and TFT, and the color filter substrate may include a color filter layer and a common electrode. The AM-LCD device is driven by an electric field between the pixel electrode and the common electrode resulting in excellent properties of transmittance and aperture ratio. However, since the AM-LCD device uses a vertical electric field, the AM-LCD device has a bad viewing angle.

An in-plane switching (IPS) mode LCD device may be used to resolve the above-mentioned limitations.

Figure 1:
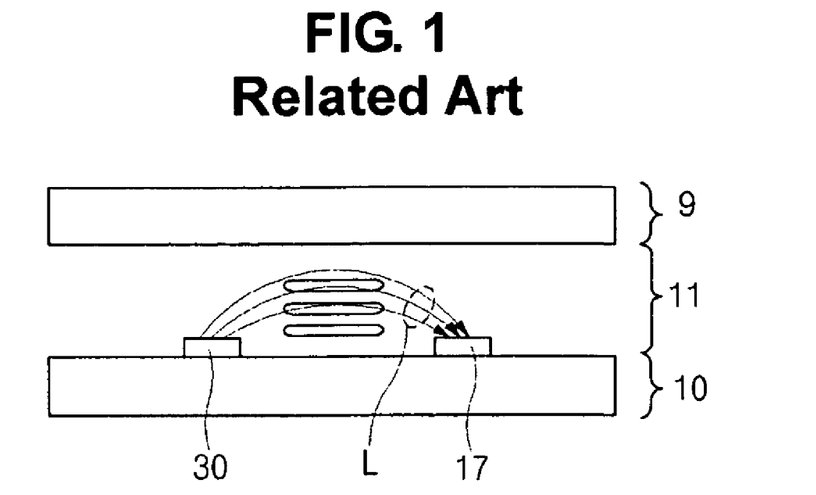
FIG. 1 is a schematic cross-sectional view of the related art IPS mode LCD device.

FIG. 1 is a schematic cross-sectional view of the related art IPS mode LCD device. In FIG. 1, the related art IPS mode LCD device includes a color filter substrate 9 as an upper substrate, an array substrate 10 as a lower substrate facing the color filter substrate, and a liquid crystal layer 11 interposed therebetween. Both common and pixel electrodes 17 and 30 for driving the liquid crystal layer 11 are formed on the array substrate 10. The liquid crystal layer 11 is driven by a horizontal electric field "L" induced between the common and pixel electrodes 17 and 30.

Figure 2A:
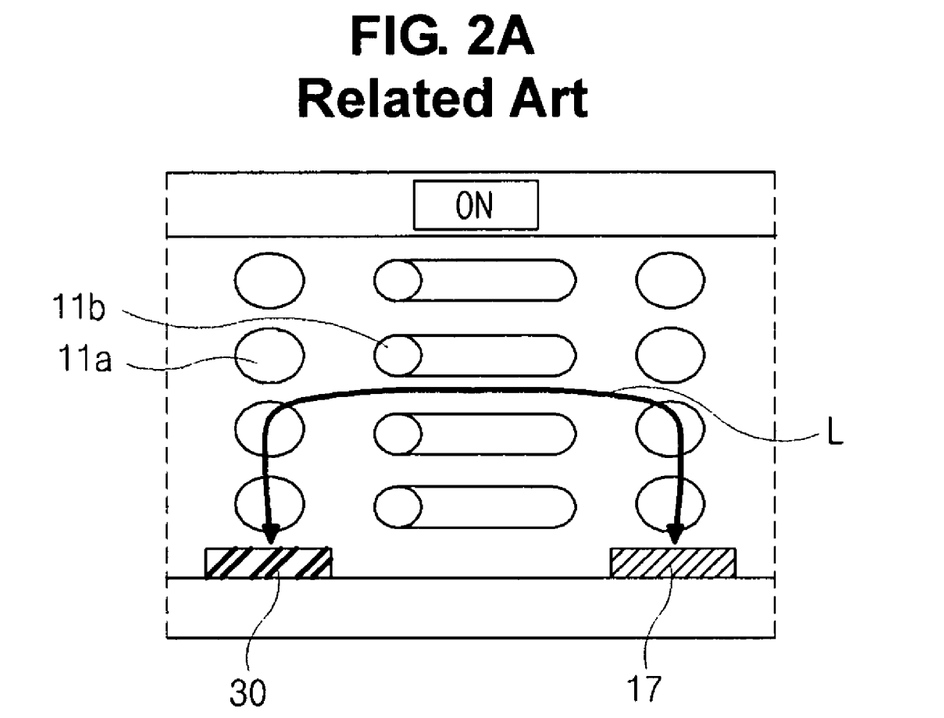
FIGS. 2A and 2B are cross-sectional views showing turned on/off conditions of an IPS mode LCD device according to the related art.
Figure 2B:
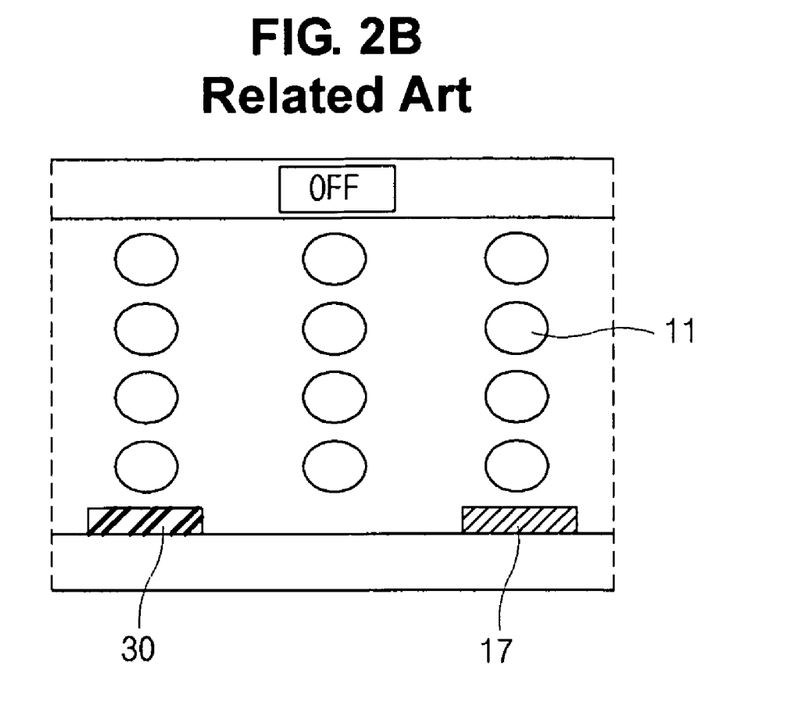

FIGS. 2A and 2B are cross-sectional views showing turned on/off conditions of an IPS mode LCD device according to the related art. As shown in FIG. 2A, when the voltage is applied to the IPS mode LCD device, liquid crystal molecules 11a above the common electrode 17 and the pixel electrode 30 are unchanged. But, liquid crystal molecules 11b between the common electrode 17 and the pixel electrode 30 are horizontally arranged due to the horizontal electric field "L". Since the liquid crystal molecules are arranged by the horizontal electric field, the IPS mode LCD device has a characteristic of a wide viewing angle. FIG. 2B shows a condition when the voltage is not applied to the IPS mode LCD device. Because an electric field is not generated between the common and pixel electrodes 17 and 30, the arrangement of liquid crystal molecules 11 is not changed.

Unfortunately, the IPS mode LCD device has disadvantages in an aperture ratio and transmissivity. To resolve these limitations, an FFS mode LCD device, where the liquid crystal molecules are driven by a fringe field, is introduced.

Figure 3:
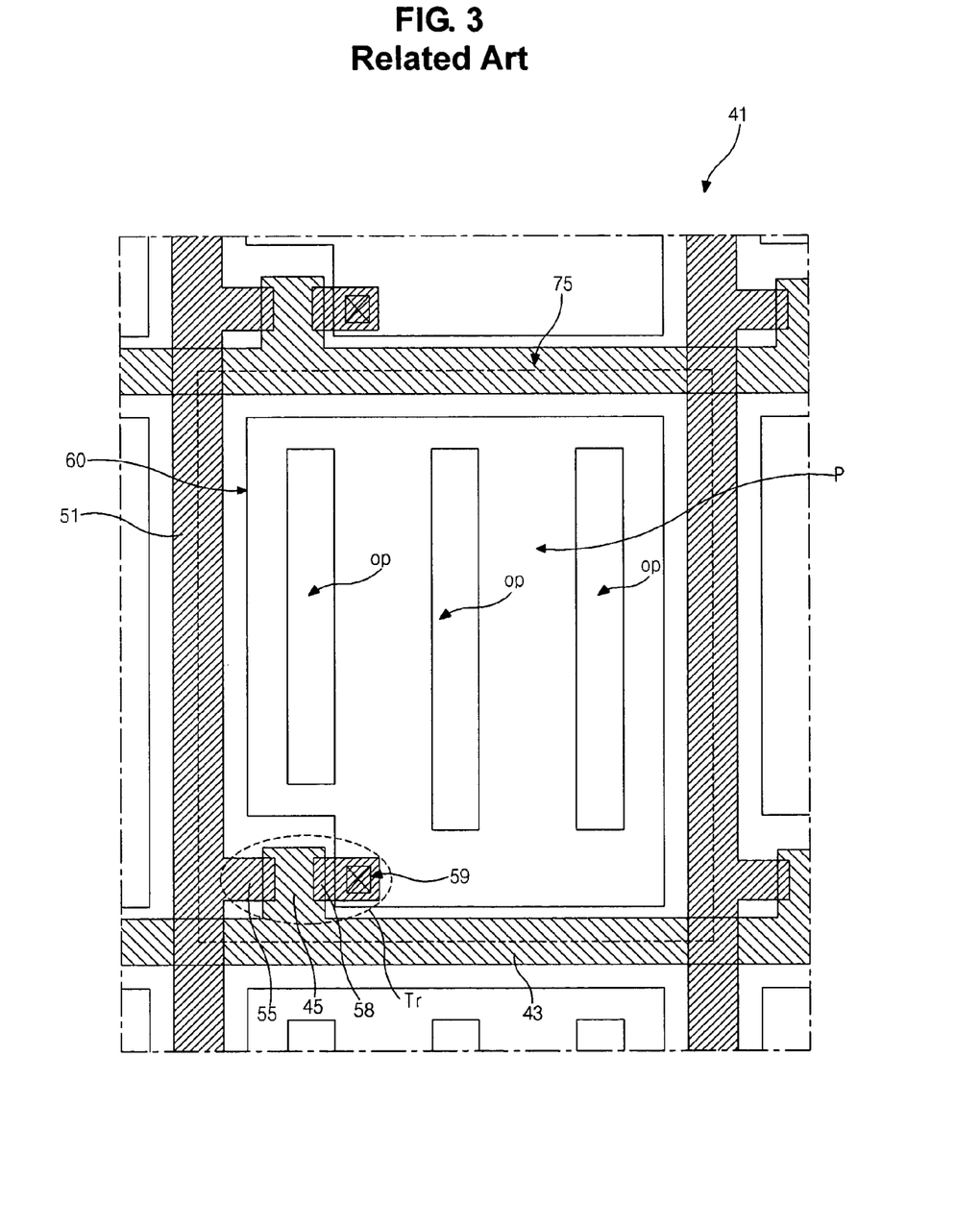
FIG. 3 is a plan view showing one pixel region the related art FFS mode LCD device.

FIG. 3 is a plan view showing one pixel region the related art FFS mode LCD device. In FIG. 3, on an array substrate 41 for the FFS mode LCD device, a gate line 43 is formed, and a data line 51 is formed to cross the gate line 43 such that a pixel region "P" is defined. In each pixel region "P", a thin film transistor Tr as a switching element is formed. The TFT "Tr" is connected to the gate and data lines 43 and 51 and includes a gate electrode 45, a gate insulating layer (not shown), a semiconductor layer (not shown), a source electrode 55 and a drain electrode 58. A pixel electrode 60 is formed in the pixel region "P". The pixel electrode 60 is connected to the drain electrode 58 of the TFT "Tr" through a drain contact hole 59 and includes a plurality of openings "op" having a bar shape. The pixel electrode 60 has a plate shape. In addition, a common electrode 75 is formed in the pixel region "P" to overlap the pixel electrode 60. The common electrode 75 covers an entire surface of a display region of the array substrate 41. A portion of the common electrode 75 corresponding to one pixel region "P" is marked as a dotted-line.

In the FFS mode LCD device having the above structure, voltages are applied to the pixel and common electrodes 60 and 75 to generate a fringe field therebetween. Unfortunately, the related art FFS mode LCD device has a mono-domain structure such that an azimuth angle is changed depending on a position of the user. For example, a color shift problem is generated at an azimuth angle such as 0, 90, 180 and 270 degrees, such that an image quality is degraded.

SUMMARY OF THE INVENTION

Accordingly, the present invention is directed to an FFS mode LCD device that substantially obviates one or more of the problems due to limitations and disadvantages of the related art.

An object of the present invention is to provide an FFS mode LCD device having a multi-domains structure.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, an array substrate for a fringe field switching mode liquid crystal display device includes a substrate including a plurality of pixel regions each having a first domain, a second domain and a domain boundary area between the first and second domains; gate and data lines on the substrate and crossing each other to define the pixel region; a thin film transistor in each pixel region and connected to the gate and data lines; a pixel electrode in each pixel region and connected to the thin film transistor; and a common electrode overlapping the pixel electrode with an insulating layer interposed between the common and pixel electrode, wherein a plurality of openings are formed through the common electrode or the pixel electrode, and each opening has a first angle in the first and second domains with respect to a rubbing direction and a second angle larger than the first angle in the domain boundary area with respect to the rubbing direction.

In another aspect of the present invention, an array substrate for a fringe field switching mode liquid crystal display device includes a substrate including a plurality of pixel region each having a first domain, a second domain and a domain boundary area between the first and second domains; gate and data lines on the substrate and crossing each other to define the pixel region; a thin film transistor in each pixel region and connected to the gate and data lines; a pixel electrode in each pixel region and connected to the thin film transistor; and a common electrode overlapping the pixel electrode with an insulating layer interposed between the common and pixel electrode, wherein a plurality of openings are formed through the common electrode or the pixel electrode, and each opening has an angle in the first and second domains a with respect to a rubbing direction and a curved shape in the domain boundary area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. The same reference numbers may be used throughout the drawings to refer to the same or like parts.

Figure 4:
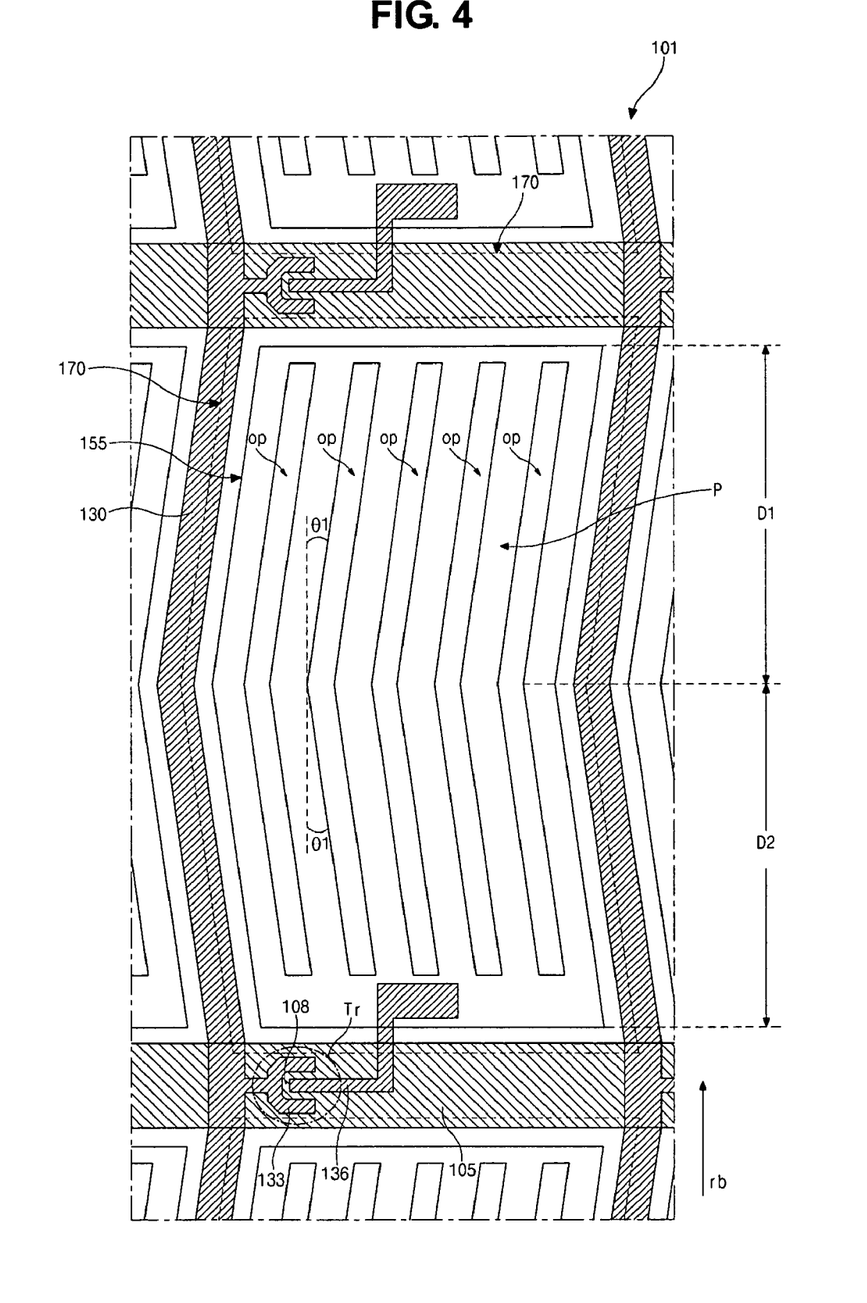
FIG. 4 is a plane view showing one pixel region of an array substrate for an FFS mode LCD device according to a first embodiment of the present invention.

FIG. 4 is a plane view showing one pixel region of an array substrate for an FFS mode LCD device according to a first embodiment of the present invention. For convenience of explanation, a region, where a plurality of pixel regions are defined, is defined as a display region, and a region at a periphery of the display region is defined as a non-display region. A switching region, where a TFT is formed, is defined in the pixel region.

In FIG. 4, a gate line 105 and a data line 130 are formed on a substrate 101 to define a pixel region "P". In each pixel region "P", a thin film transistor Tr as a switching element is formed. The TFT "Tr" is connected to the gate and data lines 105 and 130 and includes a gate electrode 108, a gate insulating layer (not shown), a semiconductor layer (not shown) including an active layer of intrinsic amorphous silicon and an ohmic contact layer of impurity-doped amorphous silicon, a source electrode 133 and a drain electrode 136. The drain electrode 136 is spaced apart from the source electrode 133 such that a portion of the active layer is exposed through the source and drain electrodes 133 and 136. The exposed portion of the active layer may be called as a channel region. FIG. 4 shows the channel region having a U-shape. The channel region may have various shapes. In addition, in FIG. 4, the TFT "Tr" is positioned on the gate line 105. Alternatively, the gate electrode 108 may protrude from the gate line 105 such that the TFT "Tr" may be position in the pixel region "P". A pixel electrode 155 having a plurality of openings "op" is formed through the pixel region "P". The pixel electrode 155 connected to the drain electrode 136 of the TFT "Tr". Each of the openings "op" has a bent bar shape. The openings "op" is spaced apart from each other. A common electrode 170 covering an entire surface of a display region including the pixel regions "P" of the substrate 101 is formed. The common electrode 170 overlaps the pixel electrode 155. A portion of the common electrode 170 corresponding to one pixel region "P" is marked as a dotted-line. The substrate including the above elements may be called as an array substrate for an FFS mode LCD device.

In the present invention, each opening "op" of the pixel electrode 155 has the bent-bar shape and is symmetrical to a virtual line along the gate line 105 and going across a center of the pixel region "P". Namely, the bent portion of the opening "op" is positioned on the virtual line. The data line 130 also has a bent portion at a center of the pixel region "P". A bent angle "θ1" of the opening "op" with respect to a rubbing direction "rb", which is perpendicular to the gate line 105 or the virtual line, has a range of about 7 to 10 degrees. The angle of the opening "op" with respect to the rubbing direction "rb" is defined as an angle of a direction horizontal to the opening "op" and a top surface of the substrate 101 with respect to the rubbing direction "rb". An upper portion of the opening "op" has the bent angle "θ1" along a clockwise direction, and a lower portion of the opening "op" has the bent angle "θ1" along a counterclockwise direction. If the opening "op" is further bent to have an angle larger than θ1 within about 7 to 10 degrees, there are improved domain properties. However, in this case, the device requires a high driving voltage and displays a white image having decreased brightness. Accordingly, the opening "op" of the pixel electrode 155 in the present invention is bent to have an angle of about 7 to 10 degrees with respect to the rubbing direction "rb".

When the opening "op" of the pixel region "P" is symmetrically bent, fringe fields in a first domain "D1" as an upper part of the pixel region "P" and a second domain "D2"

as a lower part of the pixel region "P" have different directions such that two domains are obtained. In the FFS mode LCD device including the array substrate, since liquid crystal molecules in the first domain "D1" and the second domain "D2" are driven to different direction, a color shift problem in a specific azimuth angle is prevented.

Namely, a first azimuth angle, where a color shift problem is generated, in the first domain "D1" is different from a second azimuth angle, where a color shift problem is generated, in the second domain "D2" such that a color shift problem in each of the first and second domains "D1" and "D2" is compensated by each other. As a result, the color shift problem in each pixel region "P" is reduced.

Unfortunately, when a boundary of the domains is destroyed by an outer impact because the opening "op" has a relatively small angle with respect to the rubbing direction "rb" in the above array substrate. As a result, the liquid crystal molecules in the first and second domains "D1" and "D2" are driven to the same direction such that a partial brightness decrease problem is generated. Accordingly, a stain problem is generated on the image. After the outer impact disappears, the stain problem remains on the image during a long time.

To resolve the above limitations, an array substrate for an FFS mode LCD device according to other embodiments is explained below.

Figure 5:
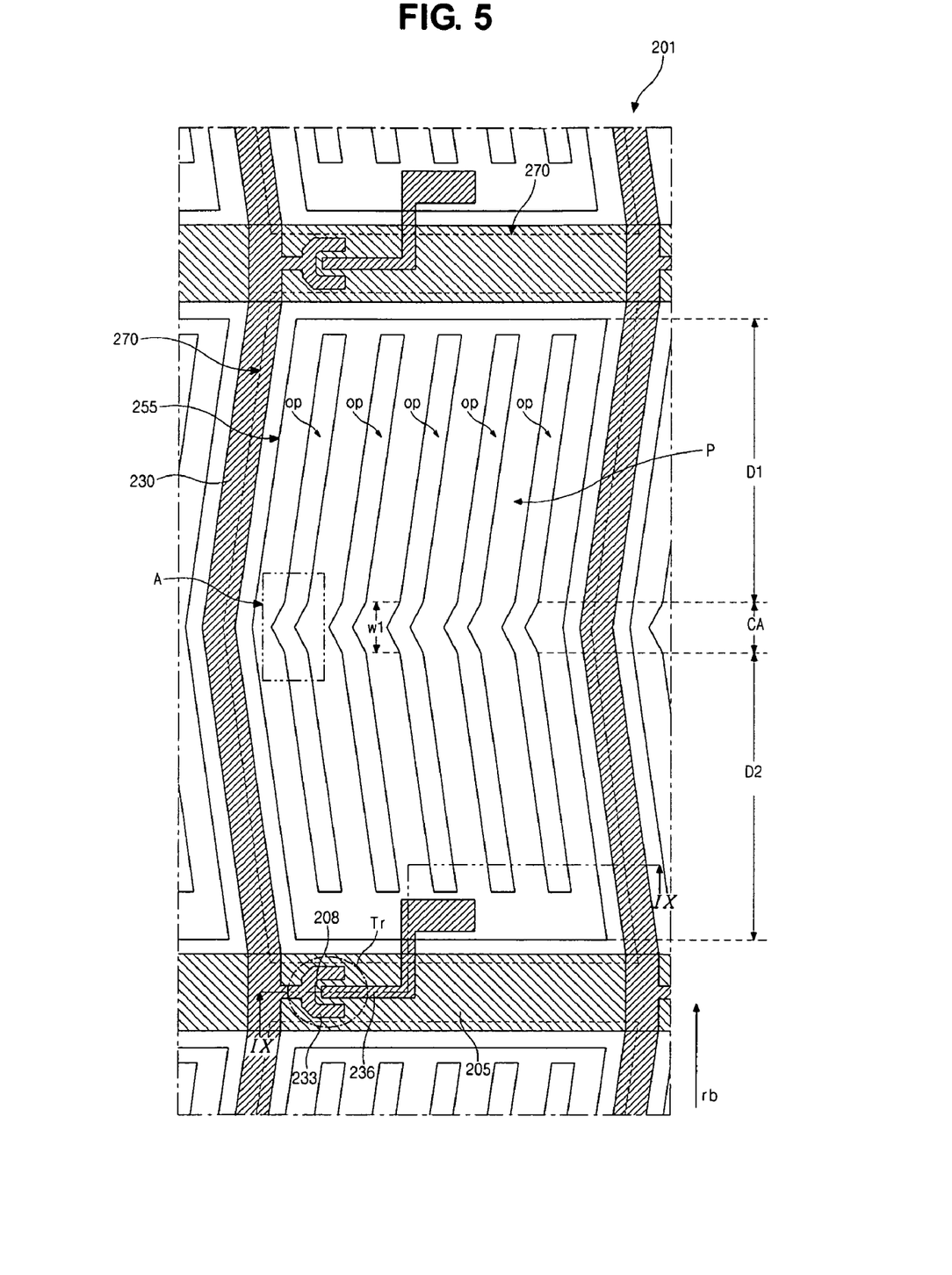
FIG. 5 is a plane view showing one pixel region of an array substrate for an FFS mode LCD device according to a second embodiment of the present invention.
Figure 6:
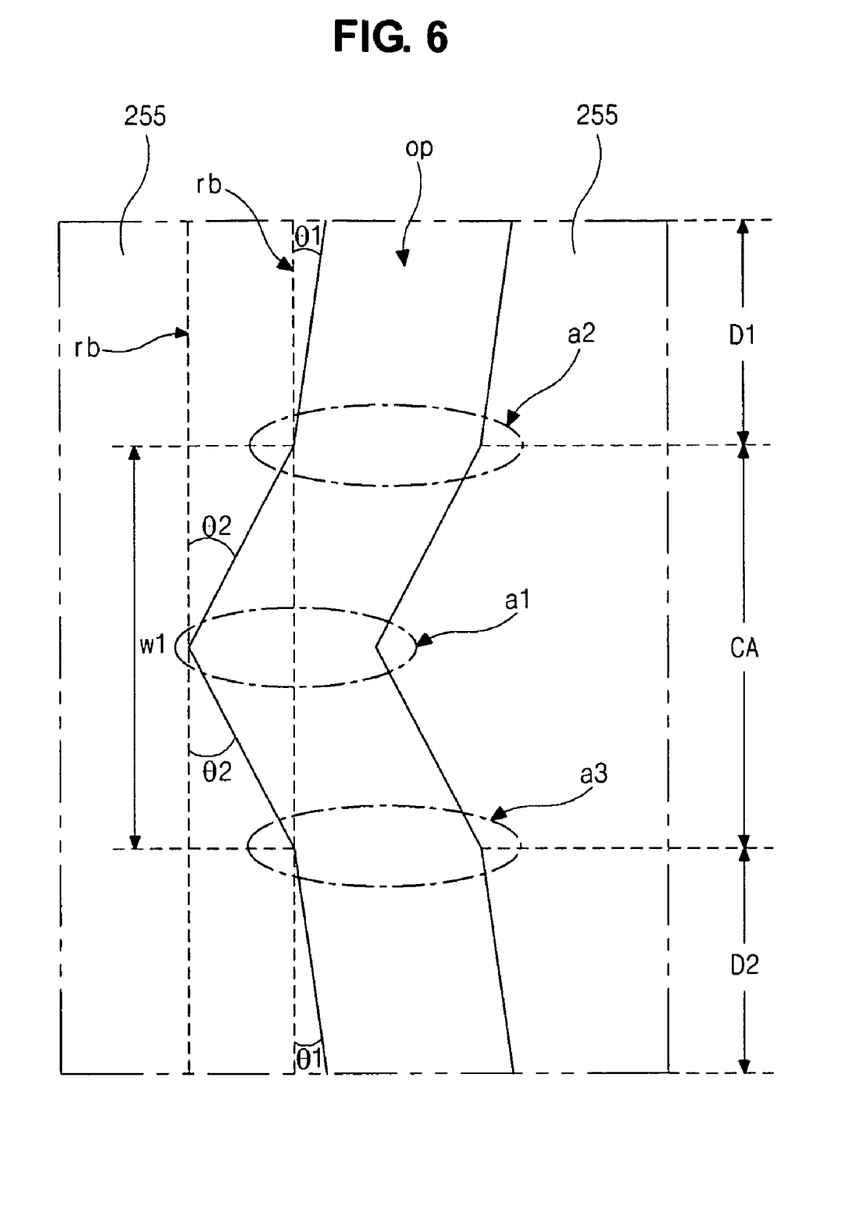
FIG. 6 is an enlarged view of an "A" portion of FIG. 5.

FIG. 5 is a plane view showing one pixel region of an array substrate for an FFS mode LCD device according to a second embodiment of the present invention, and FIG. 6 is an enlarged view of an "A" portion of FIG. 5.

In FIGS. 5 and 6, a gate line 205 and a data line 230 are formed on a substrate 201 to define a pixel region "P". In each pixel region "P", a thin film transistor Tr as a switching element is formed. The TFT "Tr" is connected to the gate and data lines 205 and 230 and includes a gate electrode 208, a gate insulating layer (not shown), a semiconductor layer (not shown) including an active layer of intrinsic amorphous silicon and an ohmic contact layer of impurity-doped amorphous silicon, a source electrode 233 and a drain electrode 236. The drain electrode 236 is spaced apart from the source electrode 233 such that a portion of the active layer is exposed through the source and drain electrodes 233 and 236. As mentioned above, a shape of a channel region of the TFT "Tr" and a position of the TFT "Tr" may be changed.

A pixel electrode 255 having a plate shape is formed in each pixel region "P" and connected to the drain electrode 236 of the TFT "Tr". In addition, a common electrode 270 covering an entire surface of the substrate 201 is formed. A portion of the common electrode 270 corresponding to one pixel region "P" is marked as a dotted-line. The common electrode 270 has a plurality of openings "op" of a bent bar shape in each pixel region "P". The openings "op" overlap the pixel electrode 255 and are spaced apart from each other.

The openings "op" through the common electrode 270 has a difference in a shape from the openings "op" of the pixel electrode 155 (of FIG. 4). The opening "op" in FIG. 4 has one bent portion, while the opening in FIGS. 5 and 6 has three bent portions "a1", "a2" and "a3". The first bent portion "a1" is positioned in a center of the pixel region "P", and the second and third bent portions "a2" and "a3" are symmetrically positioned with respect to the first bent portion "a1". Namely, the first bent portion "a1" is positioned between the second and third bent portions "a2" and "a3" and spaced apart from the second and third bent portions "a2" and "a3". A distance "w1" between the second and third bent portions "a2" and "a3" has a range within about 10 to 20 micrometers. Namely, a vertical length of the boundary area "CA" has a range within about 10 to 20 micrometers. A vertical length of each pixel region "P" is about 100 to 300 micrometers. The data line 230 also has a bent portion at a center of the pixel region "P".

A region between an end of the pixel electrode 255 and the second bent portion "a2" is defined as a first domain "D1", and a region between another end of the pixel electrode 255 and the third bent portion "a3" is defined as a second domain "D2". A region between the second and third bent portions "a2" and "a3" is defined as a boundary area "CA". Each opening "op" of the common electrode 270 in the first and second domains "D1" and "D2" has a first angle "θ1" of about 7 to 10 degrees with respect to a rubbing direction "rb" being substantially perpendicular to the gate line 205. In more detail, the opening "op" in the first domain "D1" has the first angle "θ1" along a clockwise direction with respect to the rubbing direction "rb", and the opening "op" in the second domain "D2" has the first angle "θ1" along a counterclockwise direction with respect to the rubbing direction "rb". Each opening "op" positioned between the first and second bent portions "a1" and "a2" and between the first and third bent portions "a1" and "a3" has a second angle "θ2" of about 15 to 30 degrees with respect to the rubbing direction "rb". The opening "op" in a space between the first bent portion "a1" and the second bent portion "a2" has the second angle "θ2" along a clockwise direction with respect to the rubbing direction "rb", and the opening "op" in a space between the first bent portion "a1" and the third bent portion "a3" has the second angle "θ2" along a counterclockwise direction with respect to the rubbing direction "rb". The second angle "θ2" is larger than the first angle "θ1" such that the opening "op" in the boundary area "CA" has a chevron shape. Each opening "op" of the common electrode 270 has a symmetrical shape with respect to a virtual line passing through the first bent portion "a1" and being parallel to the gate line 205.

As mentioned above, the opening "op" of the common electrode 270 has the first angle "θ1" with respect to the rubbing direction "rb" in the first and second domains "D1" and "D2", while the opening "op" of the common electrode 270 has the second angle "θ2", which is larger than the first angle "θ1", with respect to the rubbing direction "rb" in the boundary area "CA", which is a space between the second and third bent portions "a2" and "a3". The liquid crystal molecules in the boundary area "CA" have a remarkably different initial arrangement from other areas. Accordingly, even if an outer impact is applied to the device, the two domains structure is maintained.

In the first embodiment shown in FIG. 4, the opening "op" in the first domain "D1" and the opening "op" in the second domain "D2" have an angle of about 160 degrees such that an arrangement direction of the liquid crystal molecules has a difference of about 20 degrees in the first and second domains "D1" and "D2". A torque from an outer impact is larger than that of the liquid crystal molecules such that the liquid crystal molecules do not have a desired rotation. Accordingly, problems, for example, a stain, are generated on the image. However, in the second embodiment shown in FIGS. 5 and 6, the opening "op" in the boundary area "CA" has an angle of about 120 to 140 degrees such that an initial arrangement direction of the liquid crystal molecules has a difference of about 40 to 60 degrees in the boundary area "CA". Namely, the liquid crystal molecules in the boundary area "CA" have an enough torque. Accordingly, even if an outer impact is applied to the device, the liquid crystal molecules in the first and second domains "D1" and "D2" are driven to different directions such that two domains are maintained. As a result, the device has a uniform brightness such that the stain problem is prevented.

Figure 7:
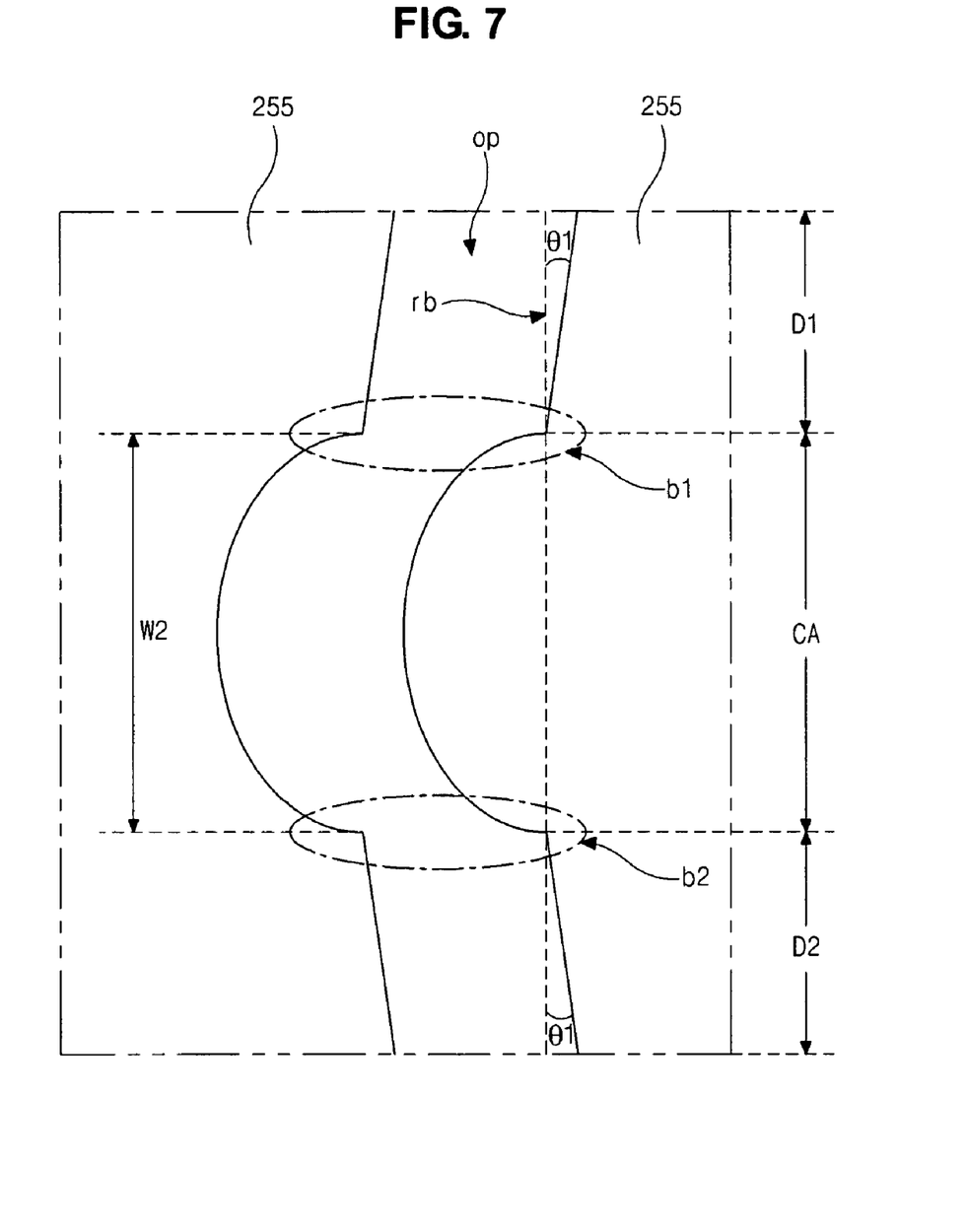
FIG. 7 is an enlarged view of an "A" portion of FIG. 5 in an array substrate for an FFS mode LCD device according to a modified embodiment of the second embodiment of the present invention.

FIG. 7 is an enlarged view of an "A" portion of FIG. 5 in an array substrate for an FFS mode LCD device according to a modified embodiment of the second embodiment of the present invention. The array substrate according to the modified embodiment has a difference in an opening positioned in the boundary area "CA". The opening "op" in FIG. 6 includes the first to third bent portions "a1", "a2" and "a3", while the opening "op" in FIG. 7 includes two bent portions.

In FIG. 7, the first domain "D1", the second domain "D2" and the boundary area "CA" are defined in the substrate. The opening "op" includes the first bent portion "b1" and the second bent portion "b2". The first bent portion "b1" is positioned between the first domain "D1" and the boundary area "CA", and the second bent portion "b2" is positioned between the boundary area "CA" and the second domain "D2". Namely, the boundary area "CA" is a space between the first and second bent portions "b1" and "b2". The opening "op" in the boundary area "CA" is curved to have a half-circular shape. Namely, the opening "op" has a curved shape at a center of the pixel region "P" and includes the first and second bent portions "b1" and b2" such that the opening "op" has a symmetrical shape. Similarly to second embodiment, the opening "op" in the first domain "D1" has a first angle "θ1" along a clockwise direction with respect to the rubbing direction "rb", and the opening "op" in the second domain "D2" has the first angle "θ2" along a clockwise direction with respect to the rubbing direction "rb". A width "w2" of the boundary area "CA", where the opening "op" has the curved shape, has a range within about 3 to 5 micrometers. Since a sudden change in an initial arrangement of the liquid crystal molecules is generated at the boundary area "CA", the device can produce a uniform brightness.

Figure 8:
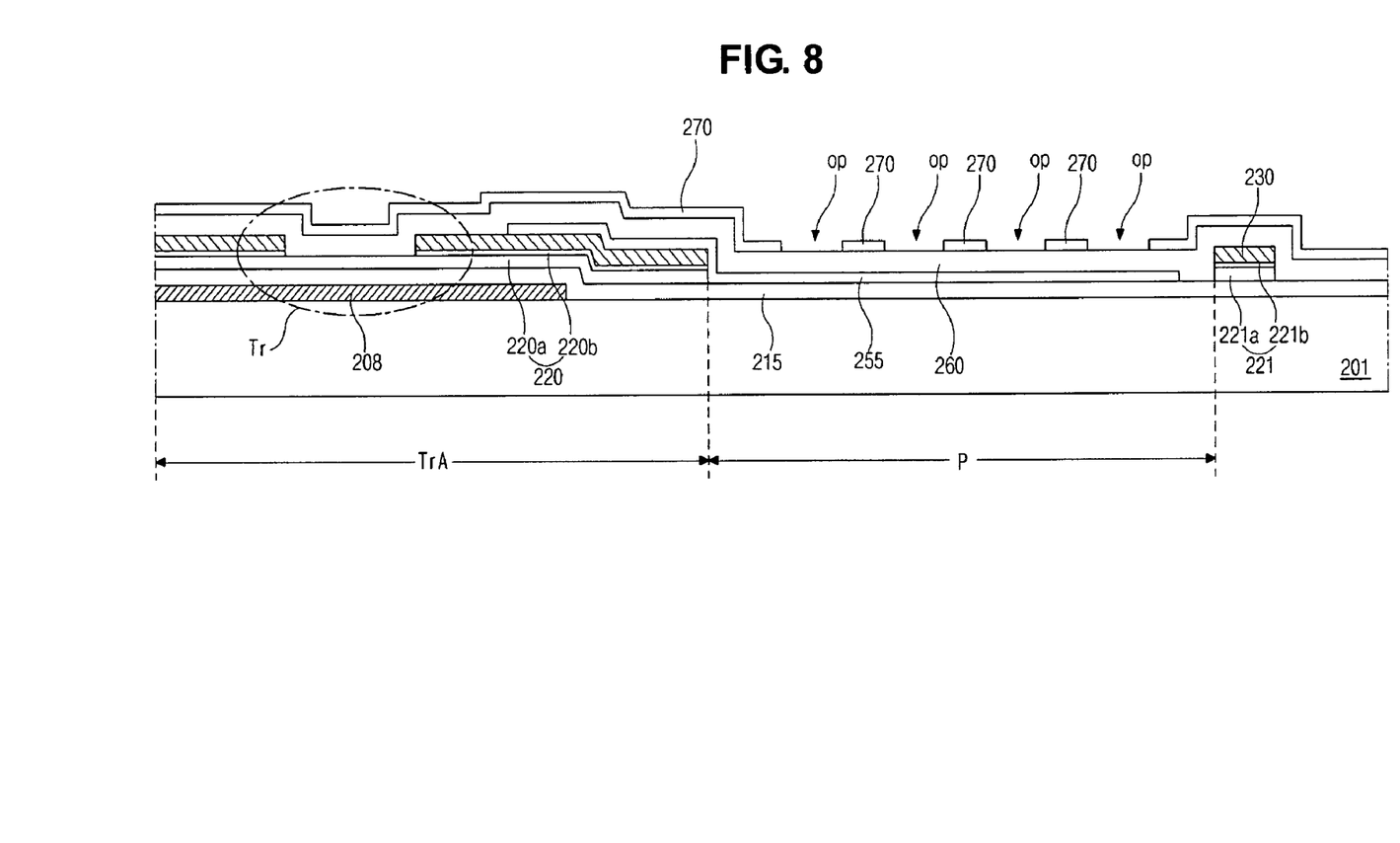
FIG. 8 is a cross-sectional view taken along the line IX-IX of FIG. 5.

A cross-sectional structure of the array substrate for the FFS mode LCD device according to the second embodiment of the present invention is explained below. FIG. 8 is a cross-sectional view taken along the line IX-IX of FIG. 5. A region, where the TFT "Tr" is formed, is defined as a switching region "TrA".

In FIG. 8, on the substrate 201, which is transparent, the gate line (not shown) is formed of a low resistance metallic material such as aluminum (Al), Al alloy, copper (Cu), Cu alloy, chromium (Cr) and molybdenum (Mo). The gate electrode 208, which connected to the gate line, is formed in the switching region "TrA". The gate insulating layer 215 of an inorganic insulating material such as silicon oxide and silicon nitride is formed on the gate line and the gate electrode 208.

The semiconductor layer 220 including the active layer 220a of intrinsic amorphous silicon and the ohmic contact layer 220b of impurity-doped amorphous silicon is formed on the gate insulating layer 215. The semiconductor layer 220 is positioned in the switching region "TrA" to overlap the gate electrode 208. The source and drain electrodes 233 and 236 spaced apart from each other are formed on the semiconductor layer 220. A portion of the active layer 220a is exposed through a space between the source and drain electrodes 233 and 236. The gate electrode 208, the gate insulating layer 215, the semiconductor layer 220, the source electrode 233 and the drain electrode 236 constitute the TFT "Tr".

In addition, the data line 230 is formed on the gate insulating layer 215. The data line 230 crosses the gate line to define the pixel region "P" and is connected to the source electrode 233. Under the data line 230, a pattern 221 including a first semiconductor pattern 221a, which is formed of the same material as the active 220a, and a second semiconductor pattern 221b, which is formed of the same material as the ohmic contact layer 220b, is disposed. The first semiconductor pattern 221a and the second semiconductor pattern 221b are formed depending on a fabricating method. The first semiconductor pattern 221a and the second semiconductor pattern 221b may be omitted.

The pixel electrode 255 having a plate shape is formed in each pixel region "P". The pixel electrode 255 is connected to the drain electrode 236 and formed of a transparent conductive material such as indium-tin-oxide (ITO) and indium-zinc-oxide (IZO). A passivation layer 260 covering the pixel electrode 255 and the TFT "Tr" is formed of an inorganic insulating material or an organic insulating material. The inorganic insulating material includes silicon oxide and silicon nitride, and the organic insulating material includes benzocyclobutene (BCB) and photo-acryl. The common electrode 270 including the openings "op" is formed on the passivation layer 260. The common electrode 270 is formed of a transparent conductive material such as indium-tin-oxide (ITO) and indium-zinc-oxide (IZO). FIG. 5 shows five openings. Alternatively, the common electrode 270 may have two to ten openings "op".

Figure 9:
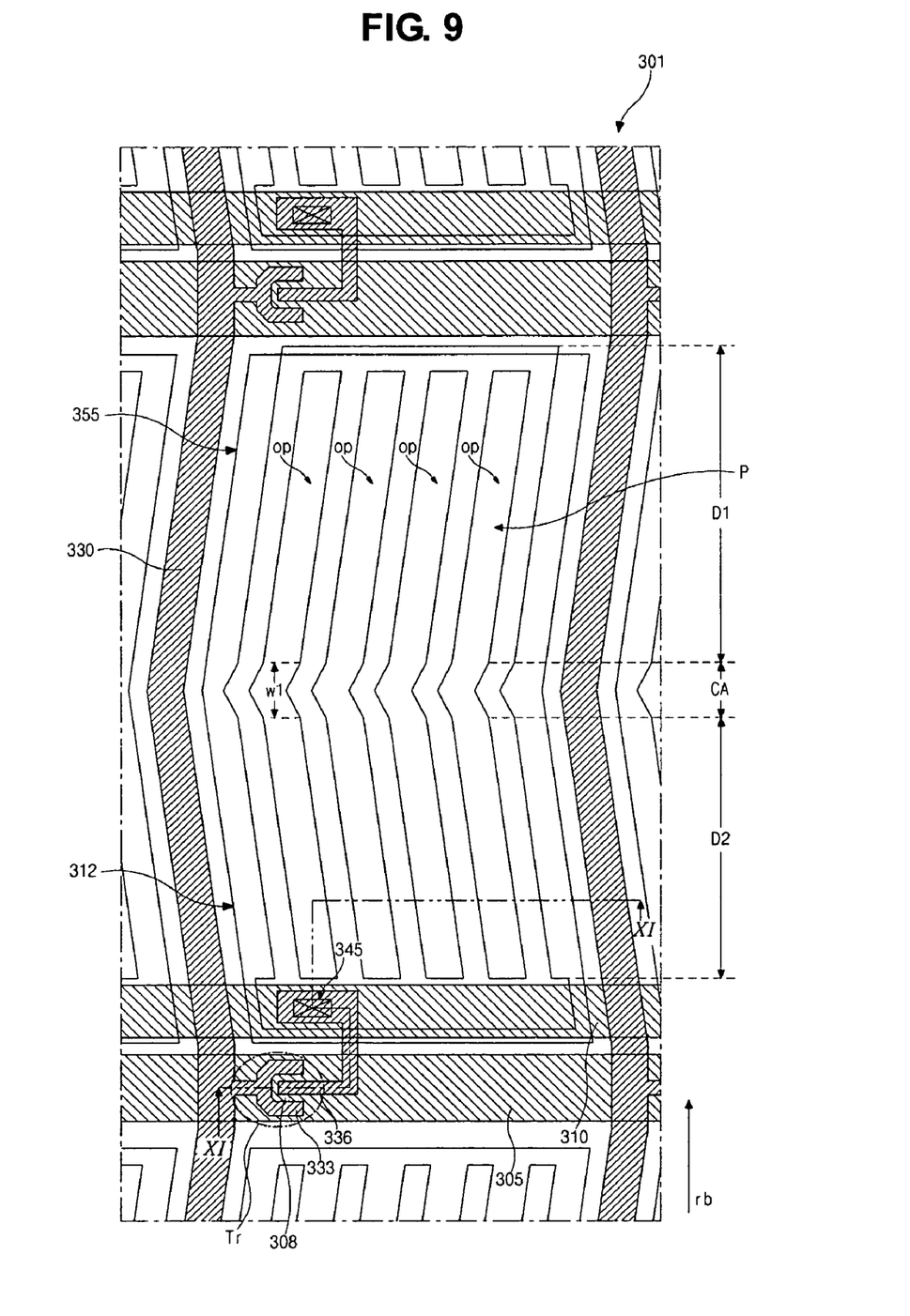
FIG. 9 is a plane view showing one pixel region of an array substrate for an FFS mode LCD device according to a third embodiment of the present invention.
Figure 10:
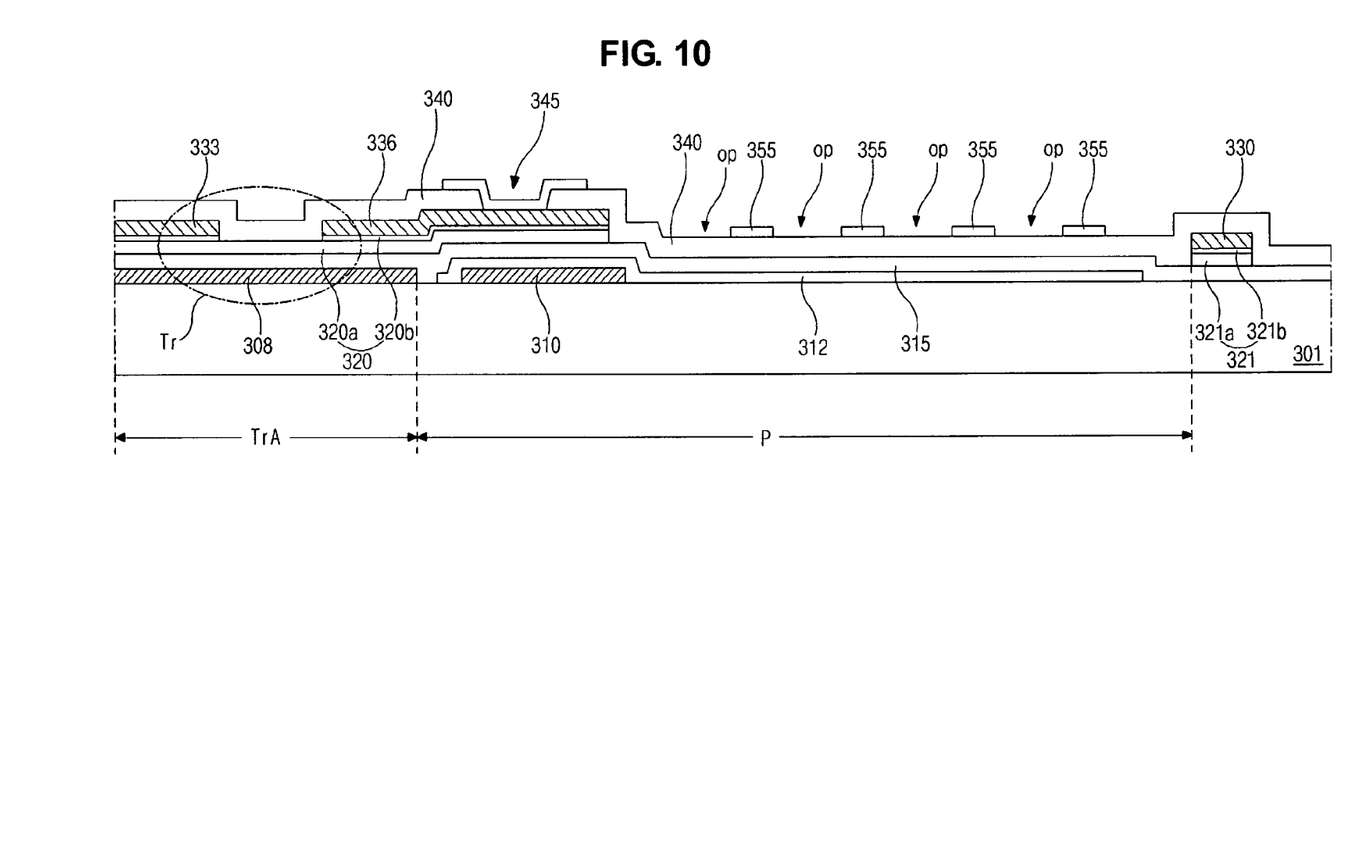
FIG. 10 is a cross-sectional view taken along the line XI-XI of FIG. 9.

FIG. 9 is a plane view showing one pixel region of an array substrate for an FFS mode LCD device according to a third embodiment of the present invention, and FIG. 10 is a cross-sectional view taken along the line XI-XI of FIG. 9.

As shown in FIGS. 9 and 10, the third embodiment has difference in shapes of a common and pixel electrodes 312 and 355, positions of the common and pixel electrodes 312 and 355 and a common line 310 from the second embodiment.

In FIGS. 9 and 10, a gate line 305 is formed on a substrate 301, and the common line 310 is formed on the substrate 301 to be spaced apart from and parallel to the gate line 301. The common electrode 312 having a plate shape is formed in each pixel region "P" and connected to the common line 310. The pixel electrode 355 including a plurality of openings "op" is positioned over the common electrode 312 and in each pixel region "P" with a gate insulating layer 315 and a passivation layer 340 interposed therebetween. The pixel electrode 355 is connected to a drain electrode 336 of a TFT "Tr" through a drain contact hole 345 of the passivation layer 340. The opening "op" has the same shape as the opening "op" as shown in FIGS. 5 and 6. Alternatively, the opening "op" of the pixel electrode 355 may have the same shape as the opening "op" in FIG. 7.

On the substrate 301, which is transparent, the gate line 305 is formed of a low resistance metallic material such as aluminum (Al), Al alloy, copper (Cu), Cu alloy, chromium (Cr) and molybdenum (Mo). The gate electrode 308, which connected to the gate line 305, is formed in the switching region "TrA". In addition, the common electrode 310 is formed of the same material and on the same layer as the gate line 305. The common electrode 312 having the plate shape is formed on the common line 310 to contact a portion of the common line 310. The common electrode 312 is formed of a transparent conductive material such as ITO and IZO. FIG. 10 shows the common electrode 312 perfectly covers the common line 310. Alternatively, the common electrode 312 may cover a portion of the common line 310. The gate insulating layer 315 of an inorganic insulating material such as silicon oxide and silicon nitride is formed on the gate line 305, the gate electrode 308 and the common electrode 312.

A semiconductor layer 320 including an active layer 320a of intrinsic amorphous silicon and an ohmic contact layer 320b of impurity-doped amorphous silicon is formed on the gate insulating layer 315. The semiconductor layer 320 is positioned in the switching region "TrA" to overlap the gate electrode 308. The source and drain electrodes 333 and 336 spaced apart from each other are formed on the semiconductor layer 320. A portion of the active layer 320a is exposed through a space between the source and drain electrodes 333 and 336. The gate electrode 308, the gate insulating layer 315, the semiconductor layer 320, the source electrode 333 and the drain electrode 336 constitute the TFT "Tr".

In addition, the data line 330 is formed on the gate insulating layer 315. The data line 330 crosses the gate line 305 to define the pixel region "P" and is connected to the source electrode 333. Under the data line 330, a pattern 321 including a first semiconductor pattern 321a, which is formed of the same material as the active 320a, and a second semiconductor pattern 321b, which is formed of the same material as the ohmic contact layer 320b, is disposed. The first semiconductor pattern 321a and the second semiconductor pattern 321b are formed depending on a fabricating method. The first semiconductor pattern 321a and the second semiconductor pattern 321b may be omitted.

A passivation layer 340 covering the TFT "Tr" is formed of an inorganic insulating material or an organic insulating material. The inorganic insulating material includes silicon oxide and silicon nitride, and the organic insulating material includes benzocyclobutene (BCB) and photo-acryl. The passivation layer 340 includes the drain contact hole 345 exposing the drain electrode 336 of the TFT "Tr".

The pixel electrode 355 including the openings "op" and having a plate shape is formed on the passivation layer 340. The pixel electrode 355 is connected to the drain electrode 236 and formed of a transparent conductive material such as indium-tin-oxide (ITO) and indium-zinc-oxide (IZO).

Similarly to the second embodiment, the array substrate of the third embodiment includes two domains "D1" and "D2" and a boundary area "CA" between the domains "D1" and "D2". As mentioned above, since the opening "op" of the pixel electrode 355 in the boundary area "CA" has an angle of about 15 to 30 degrees along a clockwise or counterclockwise direction with respect to the rubbing direction "rb", a problem in an image brightness resulted from an outer impact is prevented.

Figure 11:
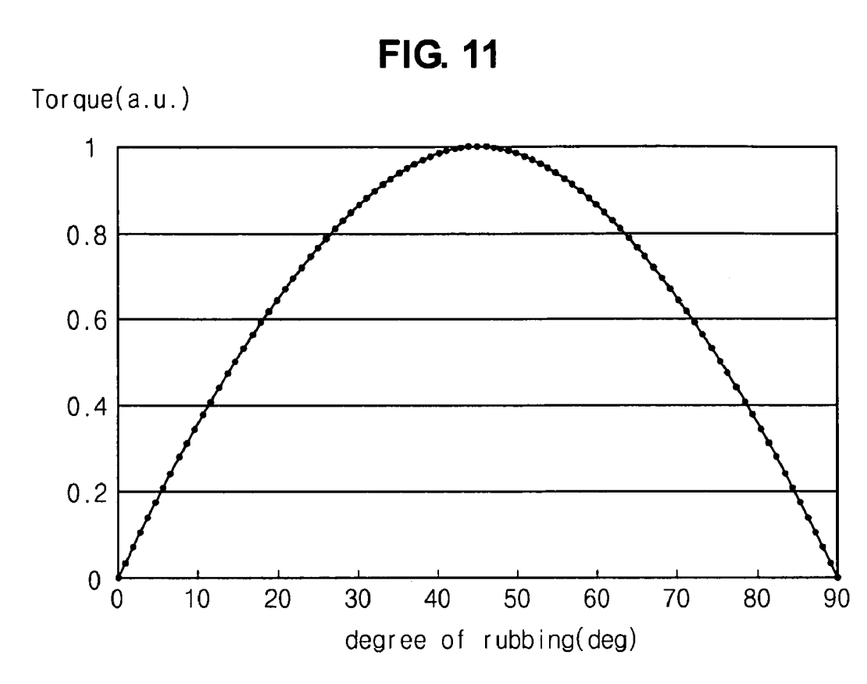
FIG. 11 is a graph illustrating a change of a torque according to a rubbing degree of a liquid crystal molecule.

Referring to FIG. 11, which is a graph illustrating a change of a torque according to a rubbing degree of a liquid crystal molecule, a torque of the liquid crystal molecules has a maximum value at a rubbing degree of 45 and is symmetrically decreased.

Assuming that the torque of the liquid crystal molecule is 1 when the liquid crystal molecule has an angle of 45 degrees with respect to the rubbing direction, the liquid crystal molecule has the torque of 0.34, 0.50, 0.64, 0.77 and 0.87 with an angle of 10, 15, 20, 25 and 30 degrees with respect to the rubbing direction, respectively. Namely, the liquid crystal molecules in the boundary area, where the opening of the common electrode or the pixel electrode has an angle of about 20 to 30 degrees with respect to the rubbing direction, have an enough torque. Accordingly, even if an outer impact is applied to the device, the liquid crystal molecules in the first and second domains are driven to different directions such that two domains are maintained. As a result, the device has a uniform brightness such that the stain problem is prevented.

The opening shown in the second embodiment or the modified embodiment of the second embodiment is formed in the common electrode. Alternatively, the opening may be formed in the pixel electrode. Similarly, the opening shown in the third embodiment is formed in the pixel electrode. Alternatively, the opening may be formed in the common electrode.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate for a fringe field switching mode liquid crystal display device, comprising:
    a substrate including a plurality of pixel regions each having a first domain, a second domain and a domain boundary area between the first and second domains;
    gate and data lines on the substrate and crossing each other to define the pixel region;
    a thin film transistor in each pixel region and connected to the gate and data lines;
    a pixel electrode in each pixel region and connected to the thin film transistor; and
    a common electrode overlapping the pixel electrode with an insulating layer interposed between the common and pixel electrode,
    wherein a plurality of openings are formed through the common electrode or the pixel electrode, and each opening has a first angle in the first and second domains with respect to a rubbing direction and a second angle larger than the first angle in the domain boundary area with respect to the rubbing direction.

2. The substrate according to claim 1, wherein each of the openings has a symmetrical shape with respect to the domain boundary area.

3. The substrate according to claim 1, wherein the first angle has a range within about 7 to 10 degrees, and the second angle has a range within about 20 to 30 degrees.

4. The substrate according to claim 1, wherein the domain boundary area has a vertical length within a range of about 10 to 20 micrometers.

5. The substrate according to claim 1, wherein the opening in the domain boundary area has a chevron shape.

6. The substrate according to claim 1, wherein the data line has a bent portion at a center of each pixel region.

7. The substrate according to claim 1, wherein each of the opening has a straight linear shape in each of the first domain, the second domain and the domain boundary area and includes a bent portion at a center of the domain boundary area and boundaries between the first domain and the domain boundary area and between the second domain and the domain boundary area.

8. The substrate according to claim 1, wherein the common electrode covers all pixel regions and disposed over the pixel electrode.

9. The substrate according to claim 1, further comprising a common line at the same layer as the gate line, wherein the common electrode contact the common line, and the pixel electrode is disposed over the common electrode.

10. An array substrate for a fringe field switching mode liquid crystal display device, comprising:
    a substrate including a plurality of pixel region each having a first domain, a second domain and a domain boundary area between the first and second domains;
    gate and data lines on the substrate and crossing each other to define the pixel region;
    a thin film transistor in each pixel region and connected to the gate and data lines;
    a pixel electrode in each pixel region and connected to the thin film transistor; and
    a common electrode overlapping the pixel electrode with an insulating layer interposed between the common and pixel electrode,
    wherein a plurality of openings are formed through the common electrode or the pixel electrode, and each opening has an angle in the first and second domains a with respect to a rubbing direction and a curved shape in the domain boundary area.

11. The substrate according to claim 10, wherein each of the openings has a symmetrical shape with respect to the domain boundary area.

12. The substrate according to claim 10, wherein the angle has a range within about 7 to 10 degrees.

13. The substrate according to claim 10, wherein the domain boundary area has a vertical length within a range of about 3 to 5 micrometers.

14. The substrate according to claim 10, wherein the data line has a bent portion at a center of each pixel region.

15. The substrate according to claim 10, wherein each of the opening has a straight linear shape in each of the first domain and the second domain and includes a bent portion at boundaries between the first domain and the domain boundary area and between the second domain and the domain boundary area.

16. The substrate according to claim 10, wherein the common electrode covers all pixel regions and disposed over the pixel electrode.

17. The substrate according to claim 10, further comprising a common line at the same layer as the gate line, wherein the common electrode contact the common line, and the pixel electrode is disposed over the common electrode.

* * * * *